(12) United States Patent
Tsao et al.

(10) Patent No.: US 8,869,291 B2
(45) Date of Patent: Oct. 21, 2014

(54) GENERATING AND STORING DOCUMENT DATA

(75) Inventors: Yeongtau Louis Tsao, Irvine, CA (US); Kevin Piazza, Santa Ana, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 13/083,502

(22) Filed: Apr. 8, 2011

(65) Prior Publication Data

US 2012/0260156 A1   Oct. 11, 2012

(51) Int. Cl.
*G06F 21/64* (2013.01)
*H04L 29/06* (2006.01)
*G06F 21/62* (2013.01)

(52) U.S. Cl.
CPC ............... *H04L 63/20* (2013.01); *G06F 21/64* (2013.01); *G06F 21/6209* (2013.01)
USPC .......................................................... 726/26

(58) Field of Classification Search
CPC ...... G06F 21/64; G06F 21/6209; H04L 63/20
USPC .......................................................... 726/26
See application file for complete search history.

(56) References Cited

U.S. PATENT DOCUMENTS

| | | | |
|---|---|---|---|
| 6,976,166 B2 | 12/2005 | Herley et al. | |
| 7,010,681 B1 * | 3/2006 | Fletcher et al. | 713/154 |
| 7,660,803 B2 | 2/2010 | Jin | |
| 2003/0231767 A1 | 12/2003 | Carbajal | |
| 2006/0050879 A1 | 3/2006 | Iizuka | |
| 2007/0003919 A1 * | 1/2007 | Stevenson et al. | 434/350 |
| 2008/0194296 A1 * | 8/2008 | Roundtree | 455/558 |

FOREIGN PATENT DOCUMENTS

JP   2006178885 A  *  7/2006

OTHER PUBLICATIONS

"Printing Overview", MSDN, Print date: Apr. 6, 2011, available at <http://msdn.microsoft.com/en-us/library/ms742418.aspx>.
J. Boyer, "Canonical XML Version 1.0", W3C Recommendation, Mar. 15, 2001, available at <http://www.w3.org/TR/2001/REC-xml-c14n-20010315>.
J. Boyer et al., "Exclusive XML Canonicalization Version 1.0", W3C Recommendation, Jul. 18, 2002, available at <http://www.w3.org/TR/2002/REC-xml-exc-c14n-20020718/>.

* cited by examiner

*Primary Examiner* — Jacob Lipman
(74) *Attorney, Agent, or Firm* — Fitzpatrick, Cella, Harper & Scinto

(57) ABSTRACT

A markup language document is generated and stored within a network, the network including a client, and one or more storage locations. A markup language document is generated, and policy information is accessed, wherein the policy information defines a content-filtering policy, a security policy and a storage location policy for the markup language document. A portion of the markup language document that is subject to security is determined, based on the content-filtering policy as defined in the policy information. A storage location is identified for storage of the markup language document from among the one or more storage locations, based on the storage location policy as defined in the policy information. Security is applied to the determined portion of the markup language document based on the security policy as defined in the policy information. The markup language document is stored on the identified storage location.

35 Claims, 16 Drawing Sheets

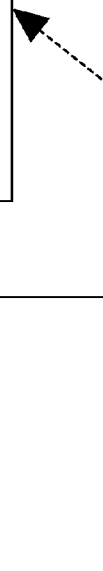

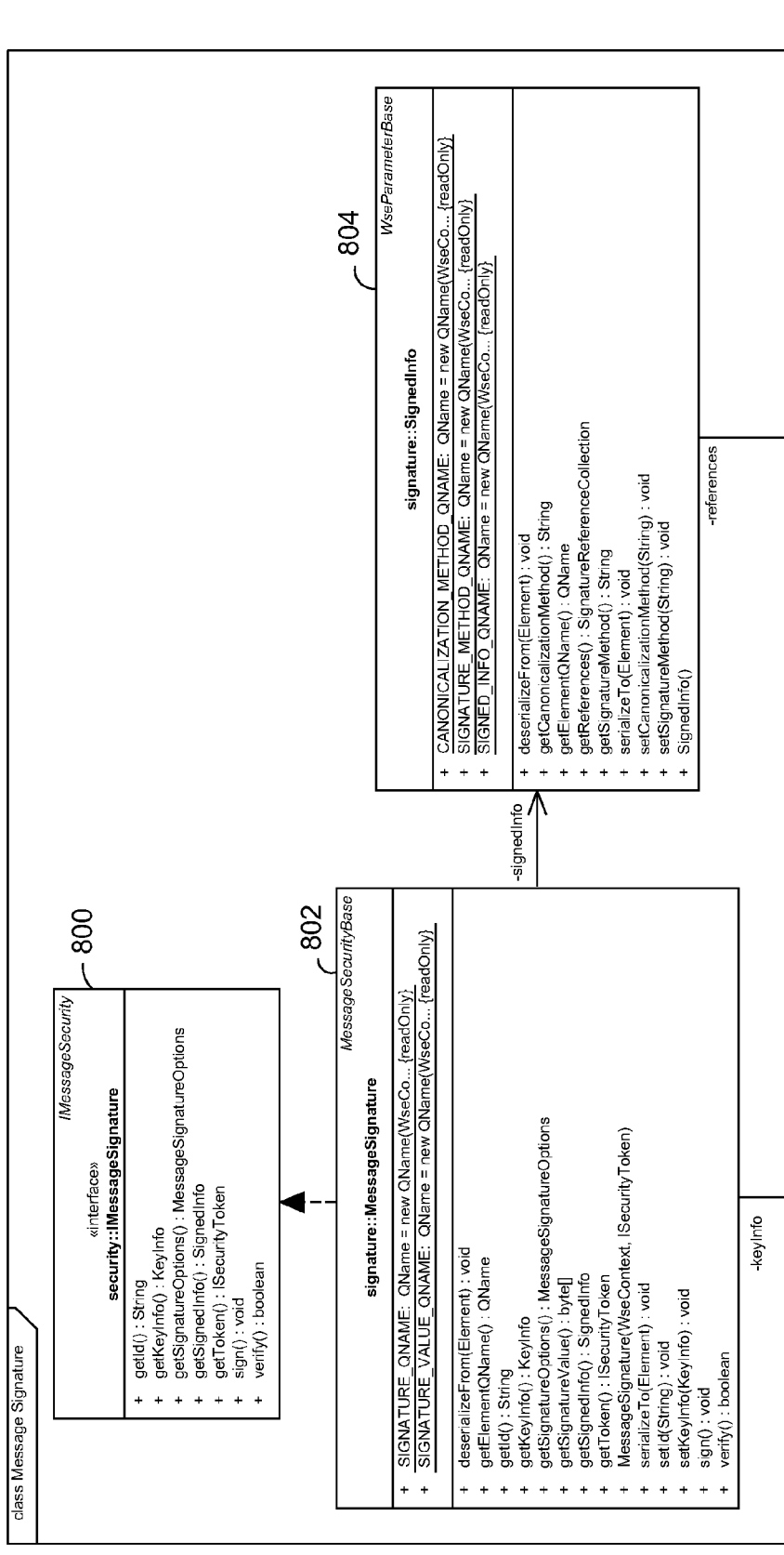

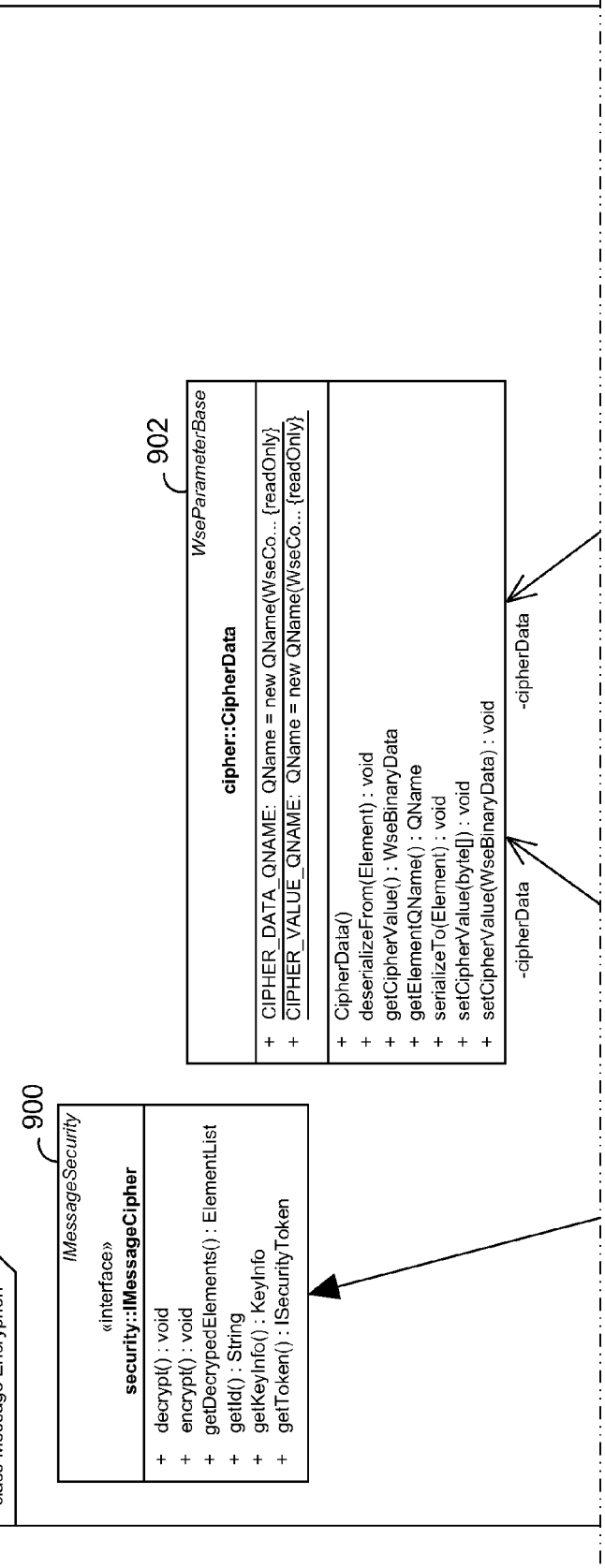

GENERATING AND STORING DOCUMENT DATA

FIELD

The present disclosure relates to the field of generating and storing document data, and more particularly relates to generating and storing a markup language document or a Portable Document Format (PDF) document within a network.

BACKGROUND

Cloud computing generally refers to applications and services offered over the Internet. With the advent of web document services (e.g., Google Docs and Microsoft Word Web App), the manipulation of document data in the cloud repository has been gaining popularity.

For example, with reference to printing or scanning technology within the cloud architecture, the saving of print or scan data to a document service storage location is typically a desired function. In this regard, network-based arrangements for generation and storage of document data can include generation of document data by a printer driver or a scanner driver.

SUMMARY

There are certain considerations that can be taken into account when utilizing the cloud infrastructure to allow a user to store print or scan data. For example, storing print data typically requires a large storage space, and the processing of such data typically requires additional processing time.

In addition, a traditional Graphics Device Interface (GDI)-based printer driver typically renders application-dependent binary data to Printer Command Language (PCL) format data, and this may be difficult for content-filtering and data extraction. In particular, the PCL language typically does not provide data integrity and confidential scheme in the data itself.

Furthermore, while conventional printer driver architecture can provide for printing data with improvements from Window's Web Services for Device (WSD), such an arrangement typically does not address issues relating to filtering and storing data to the cloud storage. However, with the growth in storage requirements typically required by cloud computing and ever-increasing processing power, together with markup language-based document data (e.g., Window XML Paper Specification (XPS) document data and PDF to Extensible Markup Language (XML) conversion data), the desire for content filtering and data extraction increases.

One concern regarding cloud computing and data storage is that when a third party is hosting or transmitting data, data security when using cloud computing can be important at all levels, including infrastructure-as-a-service (IaaS), platform-as-a-service (PaaS), and software-as-a-service (SaaS). For example, it may be desirable to protect the data itself so that only the user creating the data can view the data to ensure data privacy.

The present disclosure addresses the foregoing problems. Disclosed embodiments describe generating and storing document data within a network, the network including a client, and one or more storage locations. Policy information is accessed for a generated document, wherein the policy information defines a content-filtering policy, a security policy and a storage location policy. A portion of the document that is subject to security is determined based on the content-filtering policy, and a storage location is identified for storage of the document from among the one or more storage locations based on the storage location policy. Security is applied to the determined portion of the document based on the security policy, and the document is stored on the identified storage location.

In an example embodiment described herein, a markup language document is generated and stored within a network, the network including a client, and one or more storage locations. A markup language document is generated, and policy information is accessed, wherein the policy information defines a content-filtering policy, a security policy and a storage location policy for the markup language document. A portion of the markup language document that is subject to security is determined, based on the content-filtering policy as defined in the policy information. A storage location is identified for storage of the markup language document from among the one or more storage locations, based on the storage location policy as defined in the policy information. Security is applied to the determined portion of the markup language document based on the security policy as defined in the policy information. The markup language document is stored on the identified storage location.

The network can further include a policy server, and the policy server can be accessed to obtain the policy information. The one or more storage locations can correspond to one or more storage servers. The security policy can correspond to at least one of an encryption policy and a signing policy, and the security can be applied by respectively performing at least one of encryption and signing to the determined portion. The policy information can further define authentication information for the markup language document, and the authentication information as defined in the policy information, together with the markup language document, can be stored on the identified storage location.

The markup language document can be an XML Paper Specification (XPS) document. The network can be an enterprise network, and the content-filtering and security policies can apply enterprise-wide. The markup language document can correspond to an image document service portal, so that data within the markup language document is processed and returned to the client for reassembly and reformulation of the markup language document. A user interface can be displayed for allowing a user to adjust the policy information. The client can comprise a driver. The driver can be a printer driver or a scanner driver. The driver can perform the generating, accessing, determining, identifying, applying and storing.

The network can further include a rendering server and a policy server from which the policy information is accessed, and the driver can forward the markup language document to the rendering server for performing the generating, accessing, determining, identifying, applying and storing. The policy server and the rendering server can be implemented on a common machine within the network. Alternatively, the policy server and the rendering server can be implemented on different machines that communicate over the network. The security can be applied to the determined portion of the markup language document with both user and administrator encryption keys, based on the security policy as defined in the policy information.

In a further example embodiment, a Portable Document Format (PDF) document is generated and stored within a network, the network including a client, and one or more storage locations. A PDF document is generated, and policy information is accessed, wherein the policy information defines a content-filtering policy, a security policy and a storage location policy for the PDF document. A portion of the PDF document that is subject to security is determined, based on the content-filtering policy as defined in the policy information. A storage location is identified for storage of the PDF document from among the one or more storage locations, based on the storage location policy as defined in the policy information. Security is applied to the determined portion of the PDF document based on the security policy as defined in the policy information. The PDF document is stored on the identified storage location.

This brief summary has been provided so that the nature of this disclosure may be understood quickly. A more complete understanding can be obtained by reference to the following detailed description and to the attached drawings.

DETAILED DESCRIPTION

Figure 1:
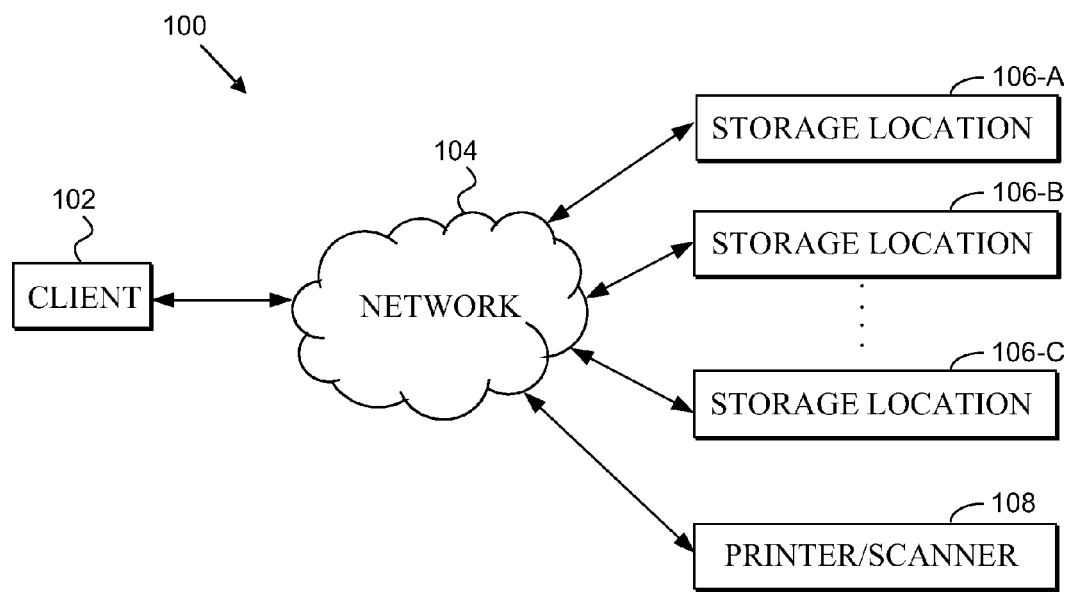
FIG. 1 is a depiction of a network environment which provides for generating and storing a document within a network according to an example embodiment.

FIG. 1 is a depiction of a network environment which provides for generating and storing a document within a network according to an example embodiment. Network environment 100 can include a client 102, storage locations 106-A to 106-C (collectively referred to as storage locations 106), and a printer/scanner 108 connected via a network 104.

Network environment 100 can provide for the generation and storage of a document, such as a markup language document or a Portable Document Format (PDF) document. Network 104 can include one or more networks, such as a local area network (LAN), a wide area network (WAN), an intranet, the Internet, or another type of network. Client 102, storage locations 106 and printer/scanner 108 can connect to network 104 via wired, wireless, optical, or other types of network connections.

Figure 2:
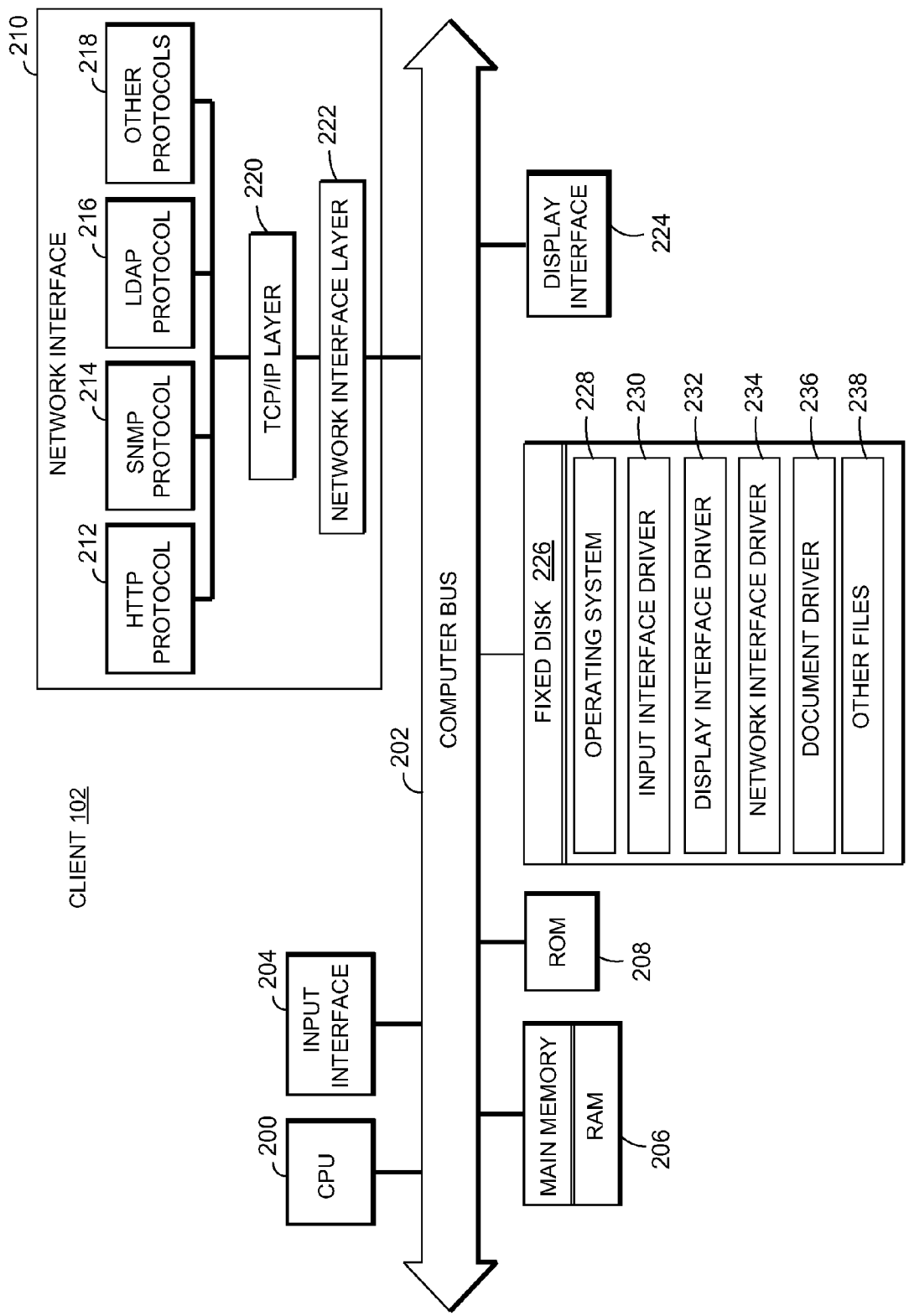
FIG. 2 is a block diagram depicting the internal architecture of a client in FIG. 1 according to an example embodiment.

FIG. 2 is a block diagram depicting the internal architecture of a client in FIG. 1 according to an example embodiment. In the example of FIG. 2, client 102 can correspond to a personal computer. However, it should be noted that client 102 can correspond to one or more types of devices, such as a personal (or laptop) computer, a computer server, a cellular phone, a personal digital assistant (PDA), or another type of communication device, a thread or process running on one of these devices, and/or objects executable by these devices. In the example of FIG. 2, the internal architectures for these other types of devices will not be described with the same amount of detail as a personal computer.

As can be seen in FIG. 2, client 102 can include a central processing unit (CPU) 200 such as a programmable microprocessor which can be interfaced to computer bus 202. Also coupled to computer bus 202 can be a input interface 204 for interfacing to an input device (e.g., keyboard, touch screen, mouse), a display interface 224 for interfacing to a display, and a network interface 210 for interfacing to a network, for example, network 104. Network interface 210 can contain several modules to provide the appropriate interface functionality for client 102.

For example, network interface 210 can contain network interface layer 222 which can be a low-level protocol layer to interface with a network (e.g., network 104). TCP/IP layer 220 can be provided above network interface layer 222 for connecting to network 104 via TCP/IP, a standard network protocol. Other protocols 218 can also be provided to allow client 102 to communicate over network 104 using other conventional protocols. In this regard, it is possible for HTTP protocol 212, SNMP protocol 214 and LDAP protocol 216 to be provided in network interface 210 for allowing client 102 to communicate over network 104 via HTTP, SNMP and LDAP protocols, respectively. However, it should be noted that HTTP, SNMP and LDAP protocols, along with other conventional protocols, can instead be provided by operating system 228.

Random access memory ("RAM") 206 can interface to computer bus 202 to provide central processing unit ("CPU") 200 with access to memory storage, thereby acting as the main run-time memory for CPU 200. In particular, when executing stored program instruction sequences, CPU 200 can load those instruction sequences from fixed disk 226 (or other memory media) into random access memory ("RAM") 206 and execute those stored program instruction sequences out of RAM 206. It should also be noted that standard-disk swapping techniques can allow segments of memory to be swapped to and from RAM 206 and fixed disk 226. Read-only memory ("ROM") 208 can store invariant instruction sequences, such as start-up instruction sequences for CPU 200 or basic input/output operation system ("BIOS") sequences for the operation of network device devices attached to client 102.

Fixed disk 226 is one example of a computer-readable medium that can store program instruction sequences executable by central processing unit ("CPU") 200 so as to constitute operating system 228, input interface driver 230 for driving input interface 204, display interface driver 232 for driving display interface 224, network interface driver 234 for driving network interface 210, document driver 236, and other files 238.

Operating system 228 can be a windowing operating system, such as Windows 95, Windows 98, Windows 2000, Windows XP, Windows 7, Windows NT, or other such operating system, although other types of operating systems such as DOS, UNIX and LINUX may be used. Other files 238 contain other information and programs necessary for client 102, to operate and to add additional functionality to client 102.

Document driver 236 can be used to generate and store a document within a network 104, such as a document sent from client 102 for printing/scanning on printer/scanner 108 and for storage on one of storage locations 106. In this regard, document driver 236 can correspond to a printer driver or a scanner driver.

Document driver 236 can access policy information, wherein the policy information defines a content-filtering policy, a security policy and a storage location policy for the document. For example, the document can correspond to a markup language document (e.g., an XPS document) or a PDF document. Document driver 236 can determine a portion of the document that is subject to security, based on the content-filtering policy as defined in the policy information.

Document driver 236 can further identify a storage location (e.g., one of storage locations 106) for storage of the document from among the one or more storage locations, based on the storage location policy as defined in the policy information. In addition, document driver 236 can apply security to the determined portion of the document based on the security policy as defined in the policy information, and can request storage of the document on the identified storage location (e.g., one of storage locations 106).

Figure 3:
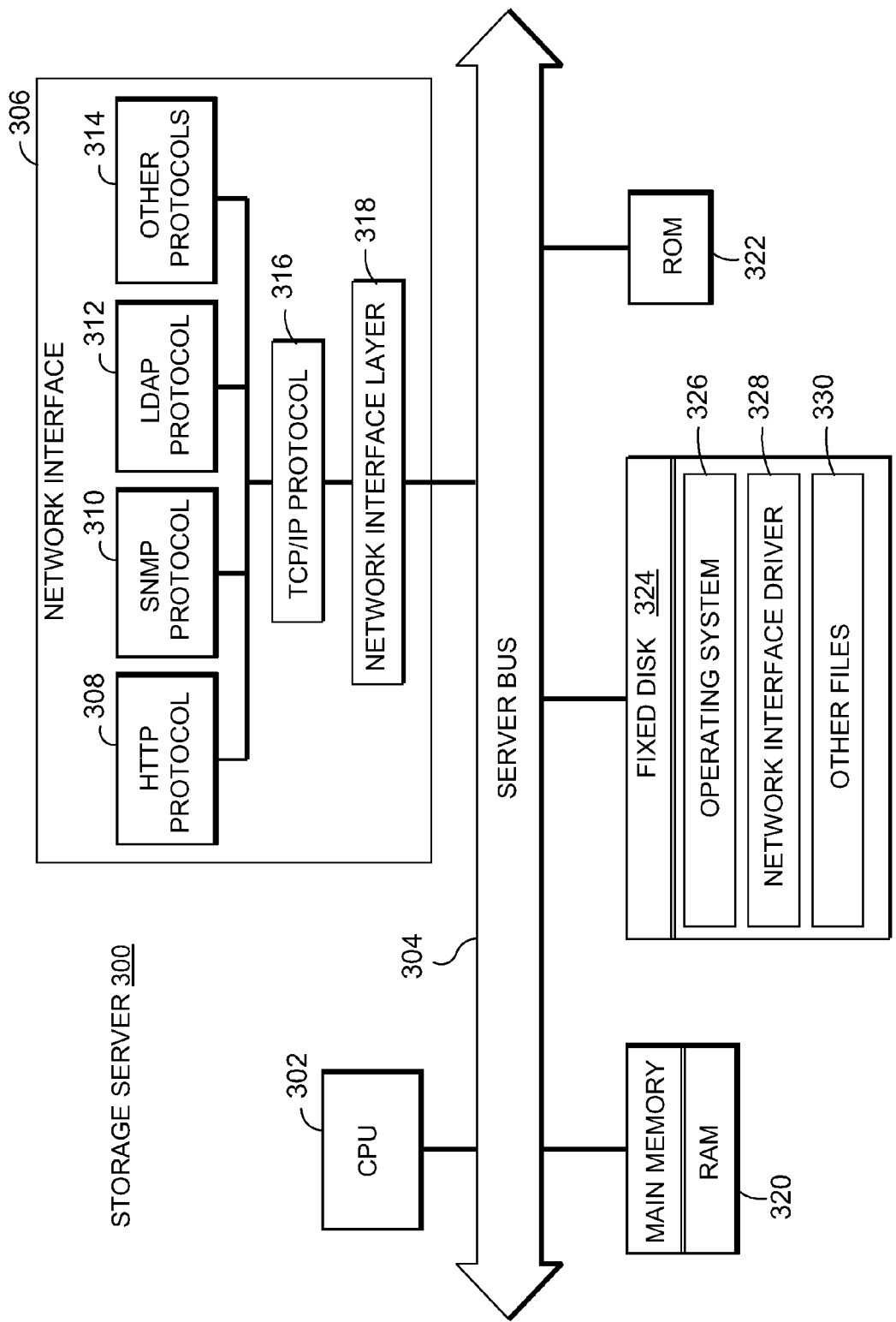
FIG. 3 is a block diagram depicting the internal architecture of a storage server shown in FIG. 1 according to an example embodiment.

FIG. 3 is a block diagram depicting the internal architecture of a storage server shown in FIG. 1 according to an example embodiment. In the example of FIG. 3, storage server 106 can correspond to an identified storage location for storing a document, where security has been applied to a portion of the document based on policy information, for example. In addition, storage server 300 can correspond to one or more of storage locations 106.

Storage server 300 can include a central processing unit ("CPU") 302 such as a programmable microprocessor which can be interfaced to server bus 304. Also coupled to server bus 304 can be a network interface 306 for interfacing to a network (e.g., network 104). In addition, random access memory ("RAM") 320, fixed disk 324, and read-only memory ("ROM") 322 can be coupled to server bus 304. RAM 320 can interface to server bus 304 to provide CPU 302 with access to memory storage, thereby acting as a main run-time memory for CPU 302. In particular, when executing stored program instruction sequences, CPU 302 can load those instruction sequences from fixed disk 324 (or other memory media) into RAM 320 and execute those stored program instruction sequences out of RAM 320. It should also be recognized that standard disk-swapping techniques can allow segments of memory to be swapped to and from RAM 320 and fixed disk 324.

ROM 322 can store invariant instruction sequences, such as start-up instruction sequences for CPU 302 or basic input/output operating system ("BIOS") sequences for the operation of network devices which may be attached to storage server 300. Network interface 306 can contain several modules to provide the appropriate interface functionality for storage server 300. For example, network interface 306 can contain network interface layer 318, which is typically a low-level protocol layer. TCP/IP protocol 316 can be provided above network interface layer 318 for communicating over a network (e.g., network 104) via TCP/IP. Other protocols 314 can also be provided to allow storage server 300 to communicate over network 104 using other conventional protocols. In this regard, it is possible for HTTP protocol 308, SNMP protocol 310, and LDAP protocol 312 to be provided in network interface 306 for allowing storage server 300 to communicate to over network 104 using HTTP, SNMP and LDAP, respectively. However, it should be noted that HTTP, SNMP and LDAP protocols, along with other conventional protocols, can instead be provided by operating system 326. The foregoing protocols can allow for storage server 300 to communicate over network 104 with other devices (e.g., client 102). For example, client 102 can generate a document and apply security to a determined portion of the document. Using one or more of the foregoing protocols, client 102 can request storage of the document on storage server 300 based on policy information.

Fixed disk 324 is one example of a computer-readable medium that stores program instruction sequences executable by CPU 302 so as to constitute operating system 326, network interface driver 328, and other files 330. Operating system 326 can be an operating system such as DOS, Windows 95, Windows 98, Windows 2000, Windows XP, Windows 7, Windows NT, UNIX, or other such operating system. Network interface driver 328 can be utilized to drive network interface 306 for interfacing storage server 300 to clients 102 via network 104. Other files 330 can contain other files or programs necessary to operate storage server 300 and/or to provide additional functionality to storage server 300.

Figure 4:
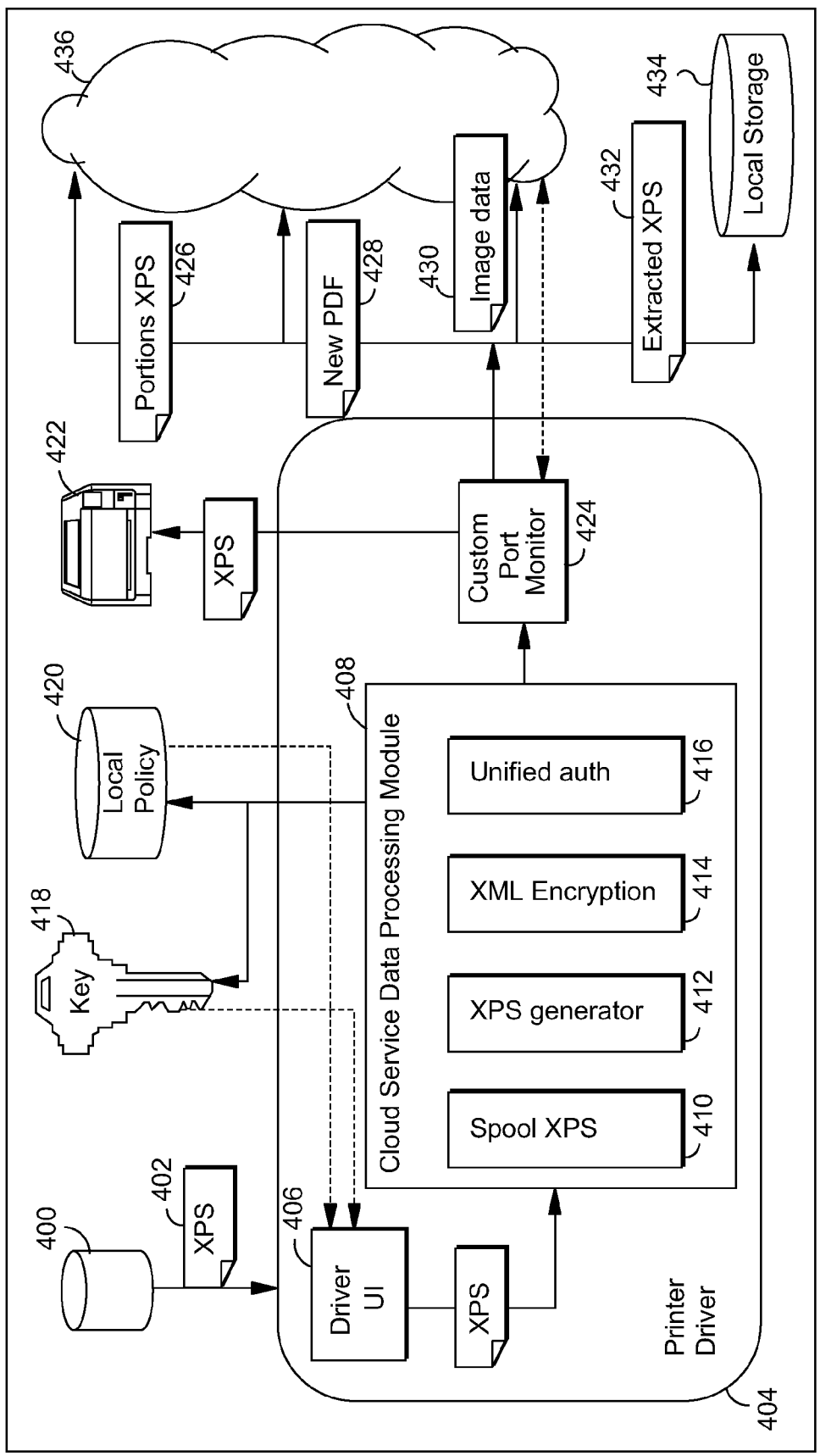
FIG. 4 is a block diagram depicting a system for generating and storing an XML Paper Specification (XPS) document with client-side rendering according to an example embodiment.

FIG. 4 is a block diagram depicting a system for generating and storing an XML Paper Specification (XPS) document with client-side rendering according to an example embodiment. In the example of FIG. 4, the document is an XPS document. However, other markup language documents or a PDF document can be used.

By generating and storing documents according to example embodiments described herein, it is possible to selectively store print/scan data based on the document purpose (e.g., by utilizing a cloud document service) along with a user-preferred format, to a storage location via a printer driver while the document is printing from a client (e.g., office application) to the printer device (e.g., printer 422). Such a printer driver can be a local printer driver (e.g., printer driver 404) or can correspond to a print server system (e.g., the system of FIG. 5, which will be described in greater detail below).

In the example of FIG. 4, a Windows standard XPS rendering method with client-side rendering is illustrated. Windows XPS print path can be used so that a Windows XPS driver 400 can render an XPS document 402. Printer driver 404 can further process the XPS document to create and encrypt the new document. In other words, printer driver 404 can use Window XPS print path to create an XPS document, and printer driver 404 can obtain the XPS data.

A policy server (e.g., local policy 420) and a user-defined policy file can be associated with the printer driver 404, and the user can define policy via driver UI 406. Module 408 in printer driver 404 can start processing the XPS print data once the data is obtained. In doing so, module 404 can retrieve policy information which defines a content-filtering policy, a security policy and a storage location policy for the XPS document. Module 404 can retrieve the policy information from a policy server (e.g., local policy 420) and/or a key store server (e.g., key 418). Key store server 418 can contain encryption and decryption keys to encrypt and decrypt the XPS document.

In this regard, module 408 can include module 410 for spooling the XPS data, module 412 for generating the XPS document, module 414 for XML encryption and module 416 for performing unified authentication. In addition, it is possible for printer driver 404 to perform content filtering with XML canonicalization and XML encryption (not shown).

Thus, before the XPS data is sent to printer 422, if a user (e.g., via driver UI 406) selects to save data or portions of the data to specific storage systems (e.g., to local storage 434), printer driver 404 can process the XPS data. Driver UI 406 or a remote UI can provide interfaces for allowing a user to select a specific storage system, and to define specific content filtering rules to encrypt specific content for privacy. For example, driver UI 406 can contain the user interface to allow the user to set policy for filtering content, encryption key location, storage location and authentication information.

The XPS data can be processed based on the cloud service and/or policy instructions given, to perform content filtering and extraction, and to apply security (e.g., encryption, digital signature) to the data. In this regard, the data may be encrypted with the user's public key so that only the user can decrypt the data.

As noted above, printer driver 404 can send the XPS data (or XPS data converted to PCL data) to printer 422, and can process the XPS data based on policy information retrieved from a policy server (e.g., local policy 420). In addition, the processed data can be sent to custom port monitor 424 for storage to designated locations. Thus, printer driver 404 can generate a new set of documents, which can correspond to portions of the document with different types of formatting based on the document type supported in the cloud, to the designated locations via custom port monitor 424.

In this regard, custom port monitor 424 can be used to direct print and storage data to designated locations. Custom port monitor 424 can include WSD, TCP/IP, virtual and default port monitors. As noted above, for authentication with different storage systems, printer driver 404 can include a module (e.g., module 416) to perform authentication with the different storage systems.

As can be seen in FIG. 4, the storage repository can be a public or private cloud storage system. In a private cloud system, hosted services are typically provided to a limited number of users behind a firewall. On the other hand, in a public cloud system, a service provider makes resources, such as applications and storage, available to the general public over the Internet.

In addition, the storage repository can correspond to enterprise storage (e.g., local storage 434), storage of an image within a cloud, Google Docs or Window Web Office. In the example of FIG. 4, designated portions of the XPS document are referenced by numeral 426, new PDF data is referenced by numeral 428, image data is referenced by numeral 430, and extracted data is referenced by numeral 432. Cloud 436 can correspond to a public cloud or a private cloud.

It should further be noted that when the user retrieves the document from storage, it is typically necessary to decrypt those portions of the document data which were subject to encryption. In this regard, the architecture illustrated in FIG. 4 can also be used for decrypting the document data.

Figure 5:
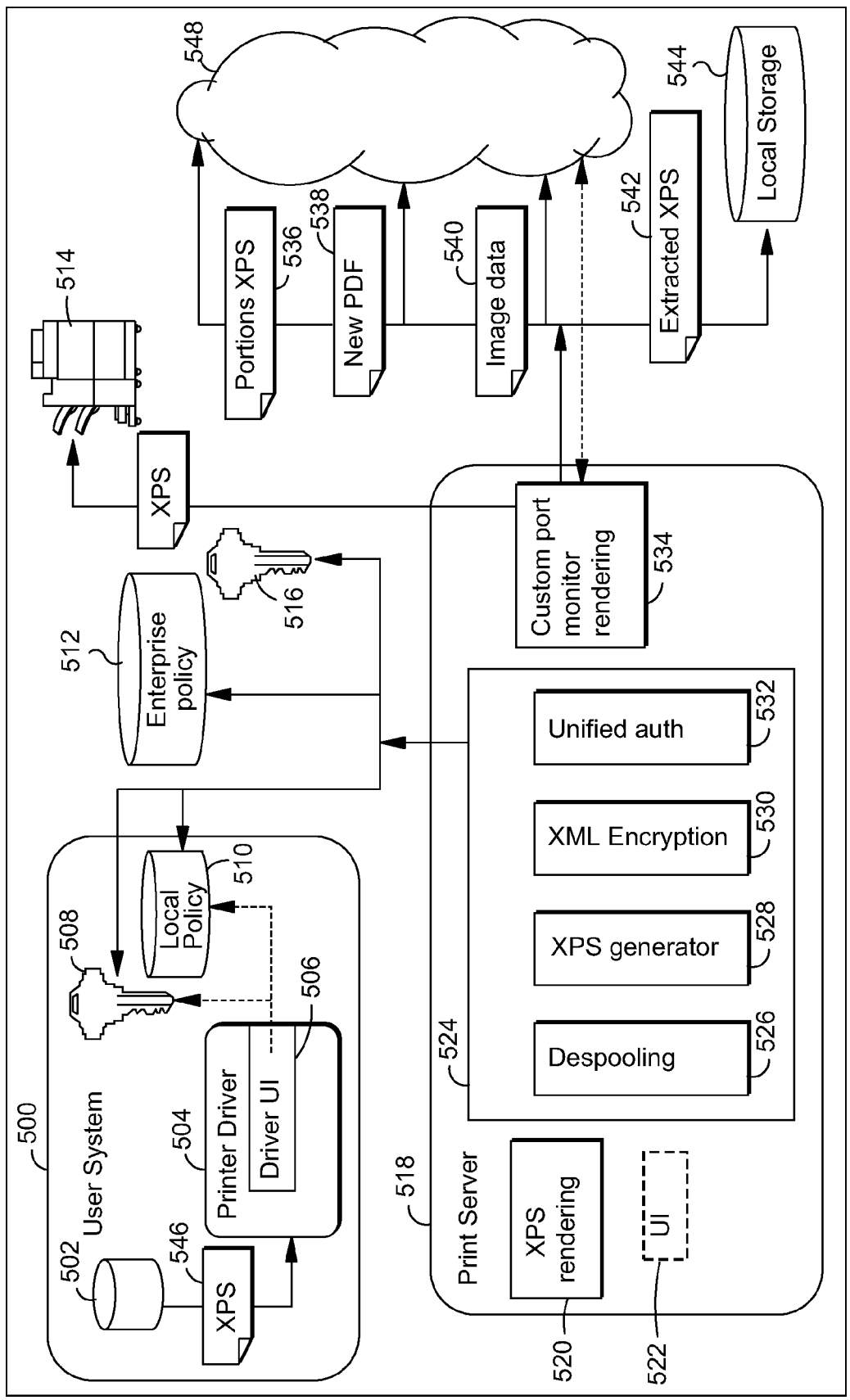
FIG. 5 is a block diagram depicting a system for generating and storing an XPS document with server-side rendering according to an example embodiment.

FIG. 5 is a block diagram depicting a system for generating and storing an XPS document with server-side rendering according to an example embodiment. In the example of FIG. 5, the document is an XPS document. However, other markup language documents or a PDF document can be used.

By generating and storing documents according to example embodiments described herein, it is possible to selectively store print/scan data based on the document purpose (e.g., by utilizing a cloud document service) along with a user-preferred format, to a storage location via a printer driver while the document is printing from a client (e.g., office application) to the printer device (e.g., printer 514). Such a printer driver can be a local printer driver or can correspond to a print server system (e.g., print server 518)

In the example of FIG. 5, a Windows standard XPS rendering method with server-side rendering is illustrated. User system 500 can include a Windows XPS driver 502, a printer driver 504 with driver UI 506, a key 508 and a local policy 510. Windows XPS print path can be used so that the Windows XPS driver 502 can render an XPS document 546, and print server 518 can further process the XPS document to create and encrypt the new document. To do this, printer driver 504 can pass the XPS data to print server 518 for rendering and print job processing. In other words, printer driver 504 can use Window XPS print path to create an XPS document, printer driver 504 can obtain the XPS data, and printer driver 504 can pass the XPS data to print server 518 for further processing. As described below, print server 518 can contain the server-side XPS rendering engine and custom port monitor 534, usually used by the enterprise.

A policy server (e.g., enterprise policy 512) and a user-defined policy file can be associated with the print server 518, and the user can define policy via UI 522. Module 524 in print server 518 can start processing the XPS print data once the data is obtained. In doing so, module 524 can retrieve policy information which defines a content-filtering policy, a security policy and a storage location policy for the XPS document. Module 524 can retrieve the policy information from a policy server (e.g., enterprise policy 512) and/or a key store server (e.g., key 516). Key store server 516 can contain encryption and decryption keys to encrypt and decrypt the XPS document.

In this regard, module 524 can include module 526 for despooling the XPS data, module 528 for generating the XPS document, module 530 for XML encryption and module 532 for performing unified authentication. Print server 518 can perform content filtering with XML canonicalization and XML encryption. In the example of FIG. 5, the encryption policy can be from a local policy server (e.g., local policy 510) and/or a central policy server (e.g., enterprise policy 512).

Thus, before the XPS data is sent to printer 514, if a user (e.g., via UI 522) selects to save data or portions of the data to specific storage systems (e.g., local storage 544), print server 518 can process the XPS data. UI 522 or a remote UI can provide interfaces for allowing a user to select a specific storage system, and to define specific content filtering rules to encrypt specific content for privacy. For example, driver UI 522 can contain the user interface to allow the user to set policy for filtering content, encryption key location, storage location and authentication information.

The XPS data can be processed based on the cloud service and/or policy instructions given, to perform content filtering and extraction, and to apply security (e.g., encryption, digital signature) to the data. In this regard, the data may be encrypted with the user's public key so that only the user can decrypt the data.

In the example of FIG. 5, the enterprise content filtering policy and the encryption policy can be retrieved with storage location and authentication information. In addition, it is possible for a second encryption policy to be retrieved.

As noted above, print server 518 can send the XPS data (or XPS data converted to PCL data) to printer 514, and can process the XPS data based on policy information retrieved from a policy server (e.g., enterprise policy 512). In addition, the processed data can be sent to custom port monitor 534 for storage to designated locations. Thus, print server 518 can generate a new set of documents, which can correspond to portions of the document with different types of formatting based on the document type supported in the cloud, to the designated locations via custom port monitor 534. In this regard, custom port monitor 534 can be used to direct print and storage data to designated locations. Custom port monitor 534 can include WSD, TCP/IP, virtual and default port monitors. As noted above, for authentication with different storage systems, print server 518 may have a module (e.g., module 532) to perform authentication with the different storage systems.

The storage repository can be a public or private cloud storage system. In addition, the storage repository can correspond to enterprise storage (e.g., local storage 544), storage of an image within a cloud, Google Docs or Window Web Office. In the example of FIG. 5, designated portions of the XPS document are referenced by numeral 536, new PDF data is referenced by numeral 538, image data is referenced by numeral 540, and extracted data is referenced by numeral 542. Cloud 548 can correspond to a public cloud or a private cloud.

It should further be noted that when the user retrieves the document from storage, it is typically necessary to decrypt those portions of the document data which were subject to encryption. In this regard, the architecture illustrated in FIG. 5 can also be used for decrypting the document data.

Figure 6:
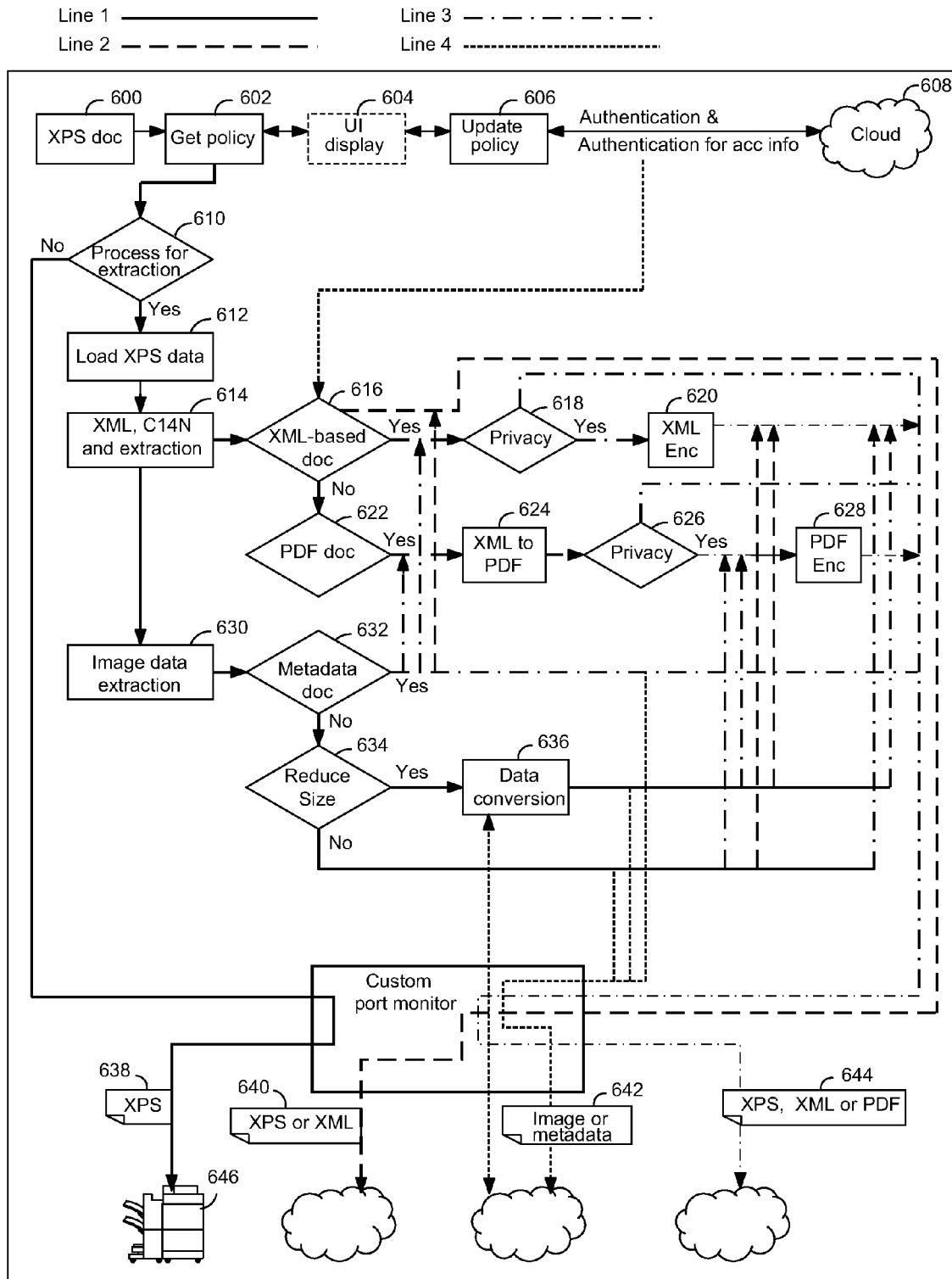
FIG. 6 is a block diagram depicting content extraction and new document creation according to example embodiments.

FIG. 6 is a block diagram depicting content extraction and new document creation according to example embodiments. In particular, FIG. 6 illustrates example flows for extracting and generating new documents for Google Docs, Microsoft Office Web storage and a service portal (e.g., a Canon service portal) while a user prints a Microsoft Office document. For an XPS document 600, policy can be obtained at block 602, a UI can be displayed at block 604, and policy can be updated at block 606 using a cloud 608.

Line 1 (shown in the legend of FIG. 6) can represent normal and generic flow for printing data. In this regard, if an XPS document is to be processed for extraction at decision diamond 610, XPS data can be loaded at block 612, XML canonicalization (abbreviated C14*n*) and extraction can performed at block 614, and image data extraction can be performed at block 630. However, if the answer to the inquiry at decision diamond 610 is 'no', the data 638 can be sent to a printer/scanner 646.

Furthermore, if the document is not XML based at decision diamond 616, a further inquiry is made whether the document is a PDF document at decision diamond 622. In addition, after image data extraction at block 630, if the document data is not metadata only at decision diamond 632, a further inquiry is made whether to reduce size of the document at decision diamond 634. If the answer is 'yes', data conversion is performed at block 636.

Regarding Line 2, this line can represent Microsoft cloud storage (if applicable) with a native XPS format to be supported. If the document is XML based at decision diamond 616, the data 640 can be sent to the cloud. If the document data is metadata only at decision diamond 632, the data 640 can also be sent to the cloud. In addition, if the data size is to be reduced at decision diamond 634, data conversion at block 636 can occur before the data 640 is sent to the cloud.

Regarding Line 3, this line can represent that Google Docs storage and XPS/XML or PDF is selected. If the document is XML based at decision diamond 616, a further inquiry at decision diamond 618 can be made whether privacy is to be used. If the answer to this inquiry is 'yes', XML encryption can be performed at block 620 before the data 642 is sent to the cloud. If the document is PDF based at decision diamond 622, XML to PDF conversion can be performed at block 624, and a further inquiry at decision diamond 626 can be made whether privacy is to be used. If the answer to this inquiry is 'yes', PDF encryption can be performed at block 628 before the data 644 is sent to the cloud.

If the document data is metadata only at decision diamond 632, flow can pass to block 624 for XML to PDF conversion, to decision diamond 618 for inquiring whether privacy is to be used, and the data 644 can be sent to the cloud. Furthermore, if the data size is to be reduced at decision diamond 634, data conversion at block 636 can occur before PDF encryption at block 628, and the data 644 can be sent to the cloud.

Regarding Line 4, this line can represent a cloud service where image extraction and image recognition are performed in the cloud. Authentication and authorization for account information can be provided to decision diamond 616, in determining whether the document is XML based. In addition, if the document is metadata only at decision diamond 632, the data 642 can be sent to the cloud. Furthermore, if the data size is to be reduced at decision diamond 634, data conversion at block 636 can occur before the data 642 is sent to the cloud.

Regarding privacy, there are a variety of use cases and methods to create and setup policy information for determining if privacy should be enforced in the document. In a cloud type setup, data stored in the public is more likely to require privacy enforcement, data stored in the enterprise may require privacy depending on company policy, and data stored locally may require privacy depending on future usage.

For availability of storage size, the use of privacy may depend on the user account and the cloud storage usage policy. Other factors may be considered for enterprise and local networks. For document size, the use of privacy may depend on encryption algorithm and key size.

The purpose of saving the print data can also be considered in determining whether to use privacy. For indexing, a small amount of data is typically recorded, and a generic XML document can be sufficient. In addition, the use of privacy can depend on whether storage will be for the entire image, compressed image, reduced image or just image metadata. Other factors may also be considered for auditing.

The document security level can also be considered in determining whether to use privacy. For high security documents, the entirety of the data may need to be encrypted before being stored. For medium security, it is possible that only portions of the document should be encrypted. For low security, it is possible that only selective data needs to be encrypted.

In addition, some types of text strings should be encrypted, including credit card numbers, bank account numbers and social security numbers. Furthermore, specific image data such as a driver's license image and credit card image should be encrypted.

Figure 7B:
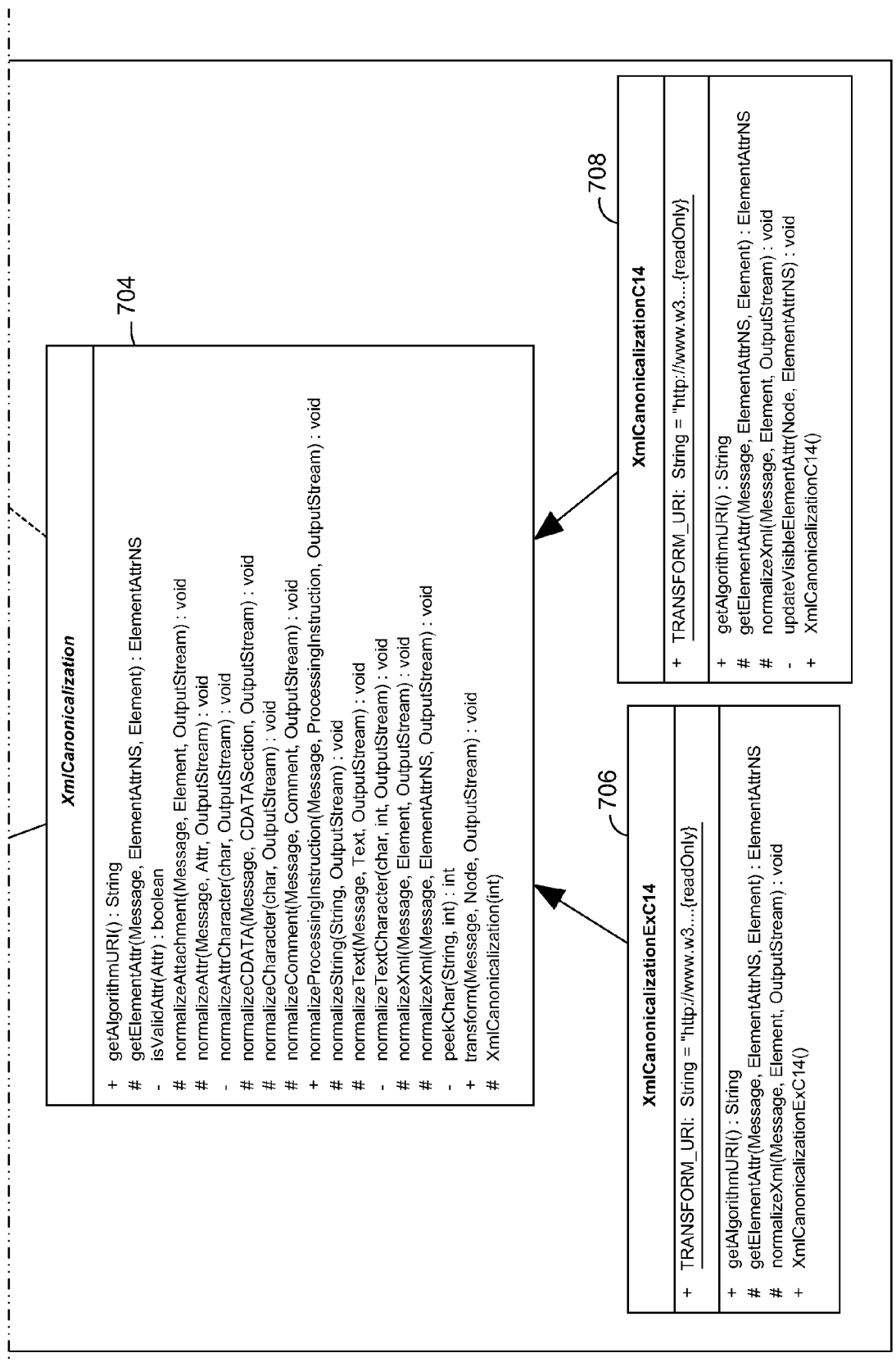
FIG. 7 is a class diagram for the relationship between XML canonicalization classes according to an example embodiment.

FIG. 7 is a class diagram for the relationship between XML canonicalization classes according to an example embodiment. In the example of FIG. 7, the classes can perform XML canonicalization for a given XML document after the XPS document is parsed by an XPS reader. As can be seen in FIG. 7, the classes can include, but are not limited to XmlWriterHandlerBase 700, ITransform 702, XmlCanonicalization 704, XmlCanonicalizationExC14 706 and XmlCanonicalizationC14 708.

XmlCanonicalization 704 can provide base XML Canonicalization implementation. XmlCanonicalizationC14 708 can implement Canonical XML. XmlCanonicalizationExC14 708 can implement Exclusive XML Canonicalization.

Figure 8B:
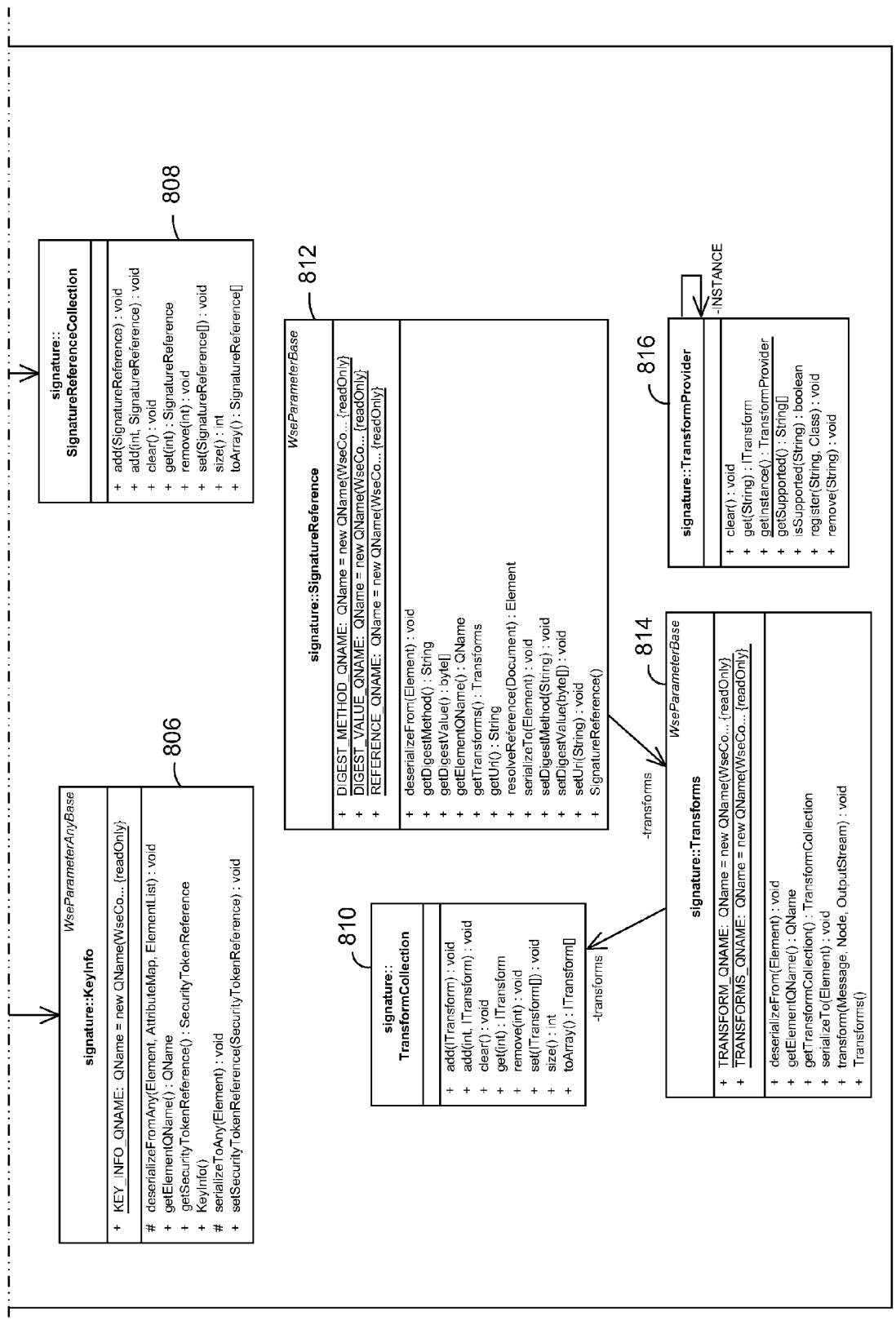
FIG. 8 is a class diagram for supporting XML digital signature for outgoing and incoming XML messages using a provided security token according to an example embodiment.

FIG. 8 is a class diagram for supporting XML digital signature for outgoing and incoming XML messages using a provided security token according to an example embodiment. In the example of FIG. 8, an XPS document may be signed with a secure token. This class diagram can correspond to a WS-Security Library class diagram that supports XML digital signature for outgoing and incoming XML messages using a provided security token. The WS-Security Library can implement IMessageSignature:IMessageSecurity interface via the MessageSignature class. The MessageSignature implementation can provide means for signing and verifying Simple Object Access Protocol (SOAP) message signature.

As can be seen in FIG. 8, the classes can include, but are not limited to, security::IMessageSignature 800, signature::MessageSignature 802, signature::SignedInfo 804, signature::KeyInfo 806, signature::SignatureReferenceCollection 808, signature::TransformCollection 810, signature::SignatureReference 812, signature::Transforms 814 and signature::TransformProvider 816.

Figure 9B:
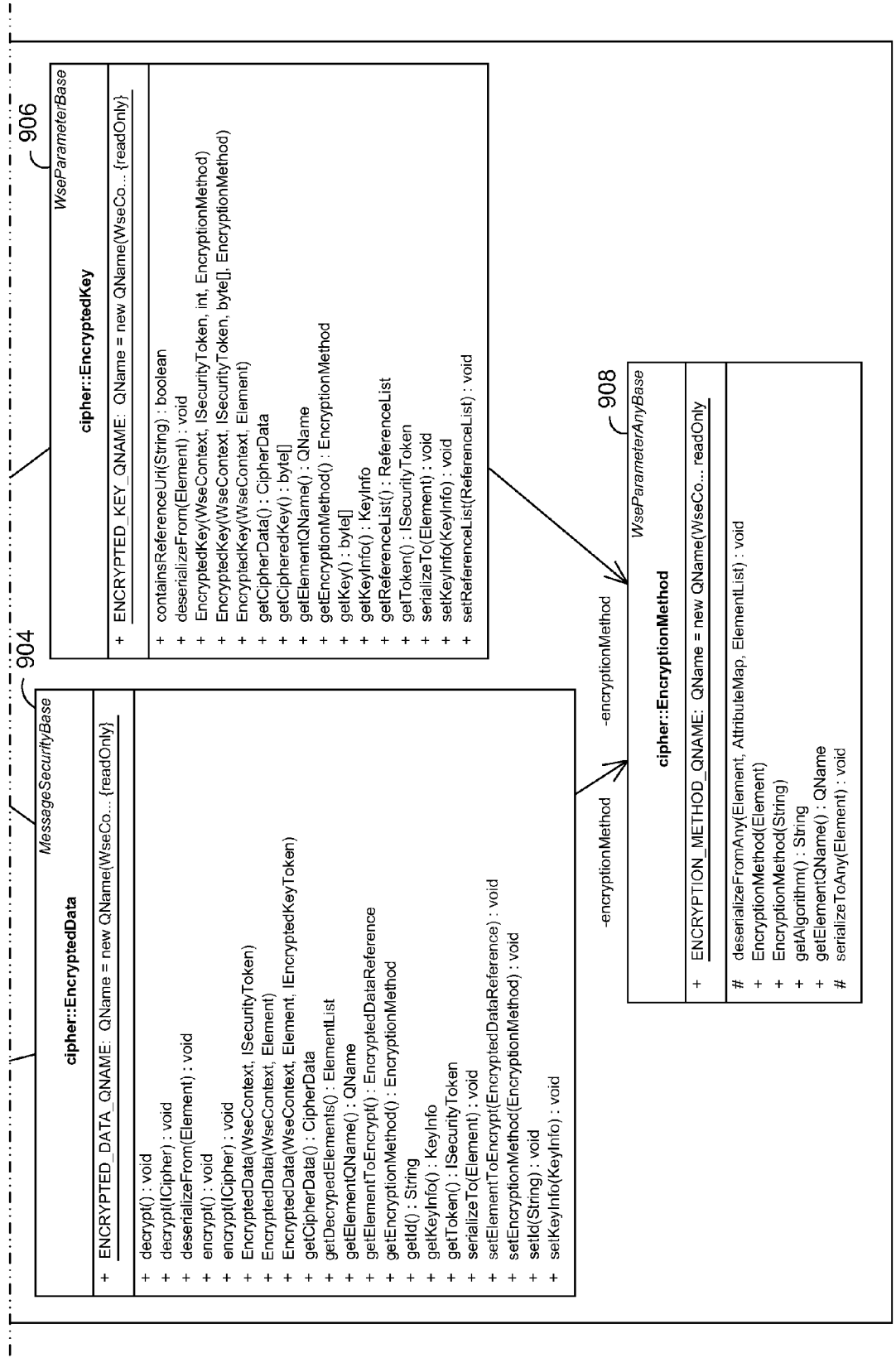
FIG. 9 is a class diagram for supporting Simple Object Access Protocol (SOAP) message encryption for outgoing and incoming SOAP messages using a provided security token according to an example embodiment.

FIG. 9 is a class diagram for supporting SOAP message encryption for outgoing and incoming SOAP messages using a provided security token according to an example embodiment. In the example of FIG. 9, for supporting privacy, the XML/XPS data may be encrypted by an encryption token. FIG. 9 illustrates an example of a WS-Security Library class that can implement IMessageCypher:IMessageSecurity interface via the EncryptedData class. The EncryptedData implementation can provide means for encrypting and decrypting a SOAP message directly via the ISecurityToken provided key or an EncryptedKey.

As can be seen in FIG. 9, the classes can include, but are not limited to security::IMessageCipher 900, cipher::CipherData 902, cipher::EncryptedData 904, cipher::EncryptedKey 906 and cipher::EncryptionMethod 908.

Figure 10:
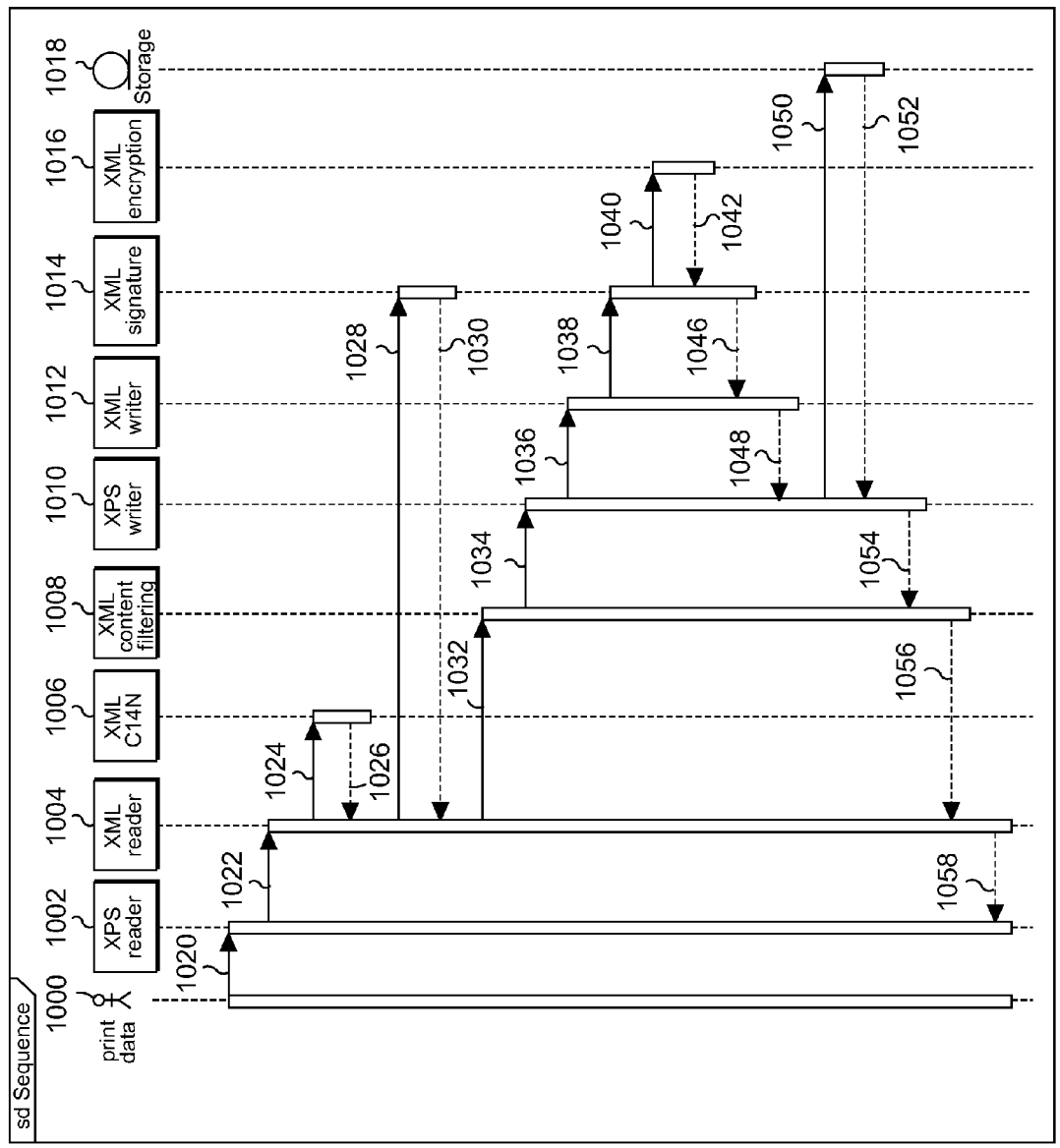
FIG. 10 is a sequence diagram depicting content extraction and encryption for an XPS document to a partial XPS document creation according to an example embodiment.

FIG. 10 is a sequence diagram depicting content extraction and encryption for an XPS document to a partial XPS document creation according to an example embodiment. FIG. 10 illustrates a sequence of steps performed on print data 1000, by XPS reader module 1002, XML reader module 1004, XML C14N (canonicalization) module 1006, XML content filtering module 1008, XPS writer module 1010, XML writer module 1012, XML signature module 1014, XML encryption module 1016 and storage module 1018.

The sequence depicted in FIG. 10 starts with receiving print data 1000 and sending it to XPS reader module 1002 (step 1020). XPS reader module 1002 utilizes XML reader module 1004 for processing the XML data within the document (step 1022). XML reader module 1004 utilizes XML C14N module 1006 to help process the XML data (step 1024). The canonicalized XML is returned in step 1026. XML reader module 1004 then uses XML signature module 1014 to provide digital signature support (step 1028). The XML data is returned in step 1030. The XML data is passed to XML content filtering module 1008 for extraction processing (step 1032). XML content filtering module 1008 utilizes XPS writer module 1010 (step 1034), which uses XML writer module 1012 (step 1036) for creating partial XPS documents. Based on policy, XML writer module 1012 utilizes XML signature module 1014 and XML encryption module 1016 to secure the content in steps 1038 and 1040. The secured content is returned in steps 1042 and 1046. The processed XML is returned to XPS writer module 1010 in step 1048. XPS writer module 1010 then sends the partial XPS document to storage 1018 (step 1050). Confirmation is returned in steps 1052, 1054, 1056, and 1058.

Figure 11:
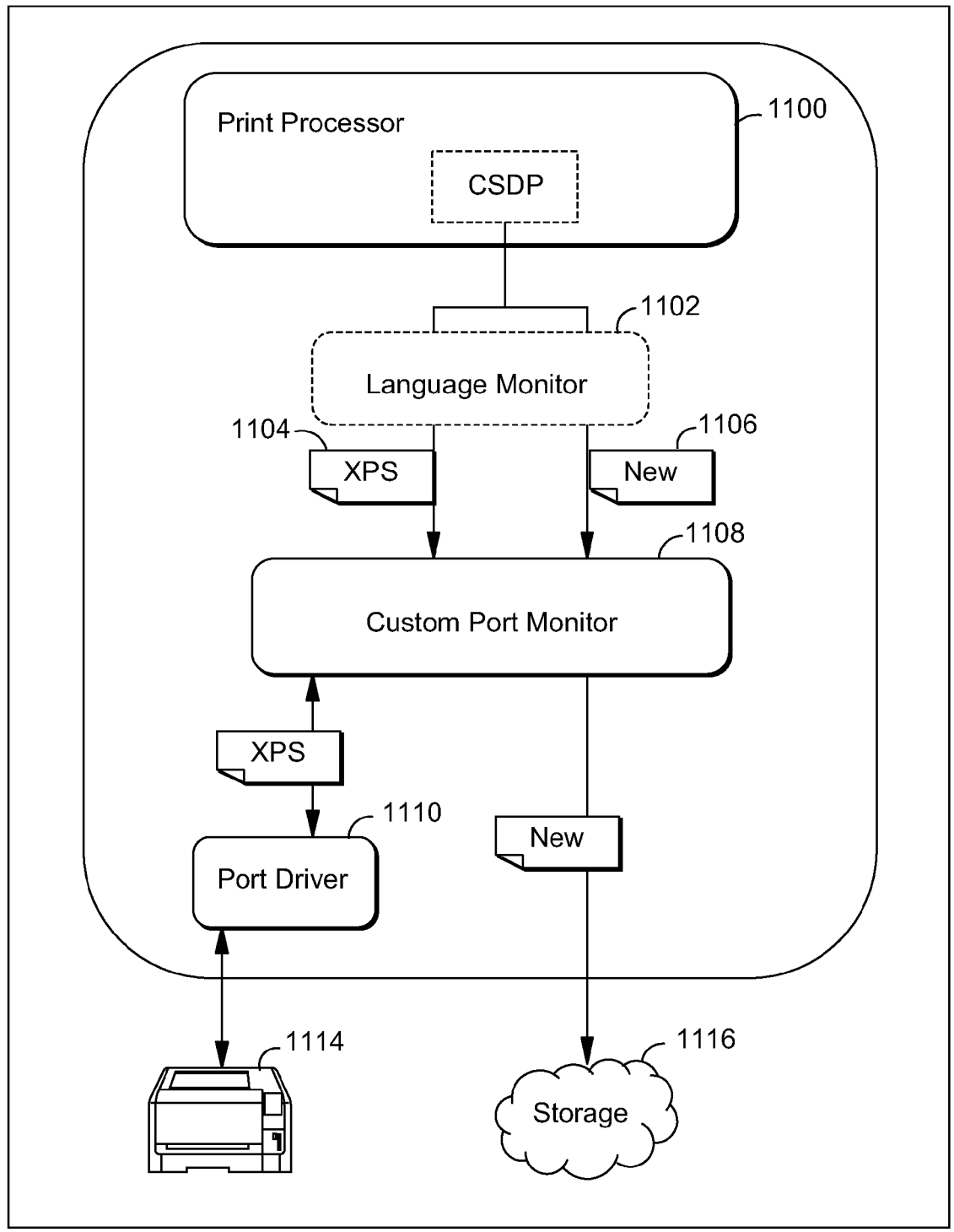
FIG. 11 is a block diagram depicting the path taken by printer data from the print processor to a printer and cloud storage via a custom port monitor according to an example embodiment.

FIG. 11 is a block diagram depicting the path taken by printer data from the print processor to a printer and cloud storage via a custom port monitor according to an example embodiment. For example, the path illustrated in FIG. 11 can apply to FIG. 4, and can apply to FIG. 5 with minor changes.

Print processor 1100 can include a Cloud Service Data Processing (CSDP) library. XPS data 1104 and new document data 1106 can pass through an optional language monitor 1102 to a custom port monitor 1108. Custom port monitor 1108 can correspond to the custom port monitors 424 and 534 in FIGS. 1 and 2, respectively. The XPS data can be sent to a port driver 1110, and then to a printer/scanner 1114. In addition, the new document data can be sent to cloud storage 1116.

Figure 12:
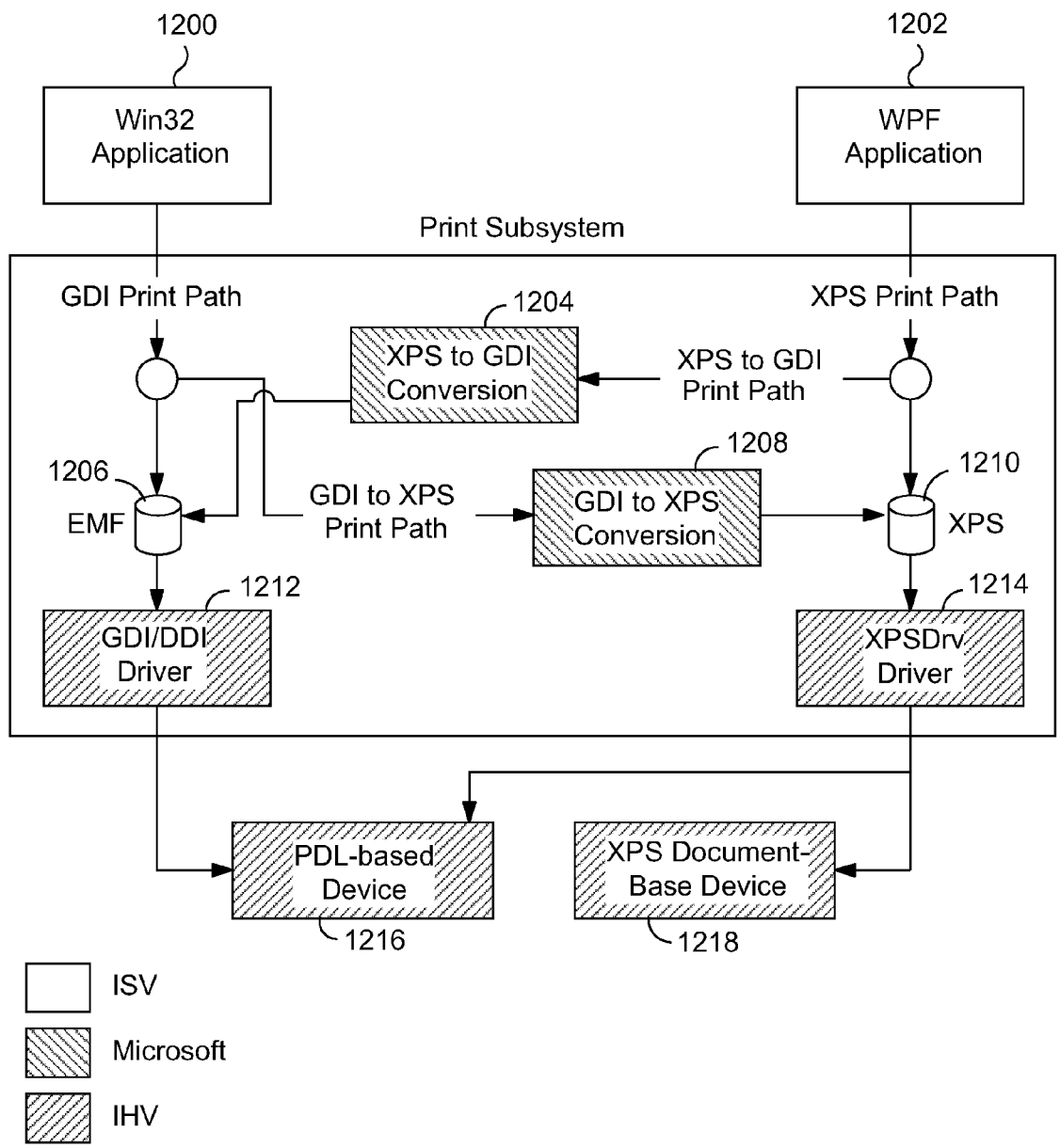
FIG. 12 is a block diagram depicting an XPS printing system according to an example embodiment.

FIG. 12 is a block diagram depicting an XPS printing system according to an example embodiment. In this regard, the XPS print path is a Windows feature that typically defines how printing is handled in Windows applications. Because XPS can replace a document presentation language such as RTF, a print spooler format such as WMF, and a page description language such as PCL or Postscript, this XPS print path maintains the XPS format from application publication to the final processing in the printer driver or device.

Win32 Application 1200 outputs GDI data which can proceed to Enhanced Metafile (EMF) 1206 spooler followed by the GDI/Device Driver Interface (DDI) Driver 1212 and finally to the Printer Description Language (PDL)-based Device 1216. The WPF Application 1202 outputs XPS data which can proceed to XPS 1210 spooler followed by the XPSDry Driver 1214 and finally to either the XPS Document-based Device 1218 or the PDL-based Device 1216. The GDI data from Win32 Application 1200 can alternatively follow the XPS print path through conversion to XPS data at GDI to XPS Conversion 1208. The XPS data from WPF Application 1202 can alternatively follow the GDI print path through conversion to GDI data at XPS to GDI Conversion 1204.

Figure 13:
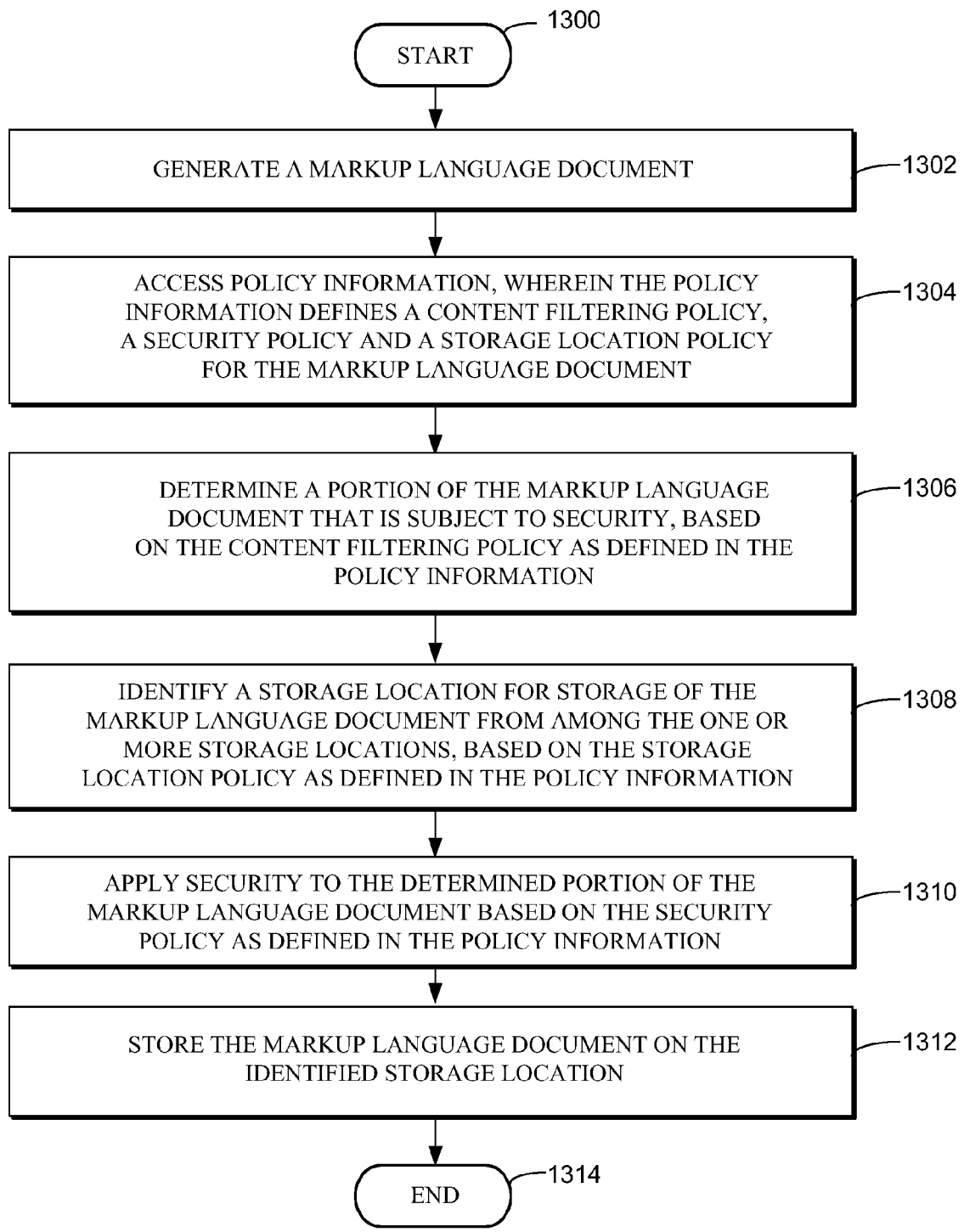
FIG. 13 is a flow diagram illustrating generating and storing a markup language document within a network according to an example embodiment.

FIG. 13 is a flow diagram illustrating generating and storing a markup language document within a network according to an example embodiment. The network can include a client and one or more storage locations. The one or more storage locations can correspond to one or more storage servers. The markup language document can be an XPS document. It should be noted that although a markup language document is described with reference to this diagram, it is possible to instead use a PDF document.

It should be noted that while process steps 1302 to 1312 are depicted sequentially, it is possible for at least two of these steps to be performed in parallel. Following start bubble 1300, a markup language document is generated at block 1302. Policy information is accessed at block 1304, wherein the policy information defines a content-filtering policy, a security policy and a storage location policy for the markup language document. The network can be an enterprise network, and the content-filtering and security policies can apply enterprise-wide. In addition, the network can further include a policy server, and the policy server can be accessed to obtain the policy information. Furthermore, a user interface can be displayed for allowing a user to adjust the policy information.

A portion of the markup language document that is subject to security is determined, based on the content-filtering policy as defined in the policy information at block 1306. At block 1308, a storage location is identified for storage of the markup language document from among the one or more storage locations, based on the storage location policy as defined in the policy information.

Security is applied to the determined portion of the markup language document based on the security policy as defined in the policy information at block 1310. The security policy can correspond to at least one of an encryption policy and a signing policy, and the security can be applied by respectively performing at least one of encryption and signing to the determined portion. The security can be applied to the determined portion of the markup language document with both user and administrator encryption keys, based on the security policy as defined in the policy information.

The markup language document is stored on the identified storage location at block 1312, and the process ends at end bubble 1314. I should be noted that the policy information can further define authentication information for the markup language document, and the authentication information as defined in the policy information, together with the markup language document, can be stored on the identified storage location.

The markup language document can correspond to an image document service portal, so that data within the markup language document is processed and returned to the client for reassembly and reformulation of the markup language document. The client can comprise a driver (e.g., a printer driver or a scanner driver), and the driver can perform the generating, accessing, determining, identifying, applying and storing.

The network can further include a rendering server and a policy server from which the policy information is accessed, and the driver can forward the markup language document to the rendering server for performing the generating, accessing, determining, identifying, applying and storing. The policy server and the rendering server can be implemented on a common machine within the network. Alternatively, the policy server and the rendering server can be implemented on different machines that communicate over the network.

Accordingly, the example embodiments described above can address the problems associated with utilizing the cloud infrastructure to allow a user to store print or scan data. One such problem is selectively storing print data for different types of cloud storage systems based on the cloud service document type (which may be associated with a user account), available storage size and document format supported to perform content extraction. Examples associated with this include the PDF document type, the XPS document type, the image data type, enterprise storage and local storage.

For PDF documents (e.g., Google Docs service), privacy should be enforced. A variety of document formats are supported based on the use account type and uploading files of any type without converting to an internal format of Google. The example embodiments described above can allow a user to selectively store data of interest with privacy protection and proper format during printing a document.

For XPS documents (e.g., Microsoft Office Web App), privacy should also be enforced. With availability of the web-based version of Microsoft Office, and since XPS is a Microsoft standard document format, it is possible that native XPS document uploading service will be supported by Microsoft-based cloud service.

For image data, (e.g., cloud service portal), privacy should be enforced. For an image-based service type of cloud service storage system, the data to be stored should relate to image file formats, and the stored image can be a lossy compressed image or just image metadata. As such, the example embodiments described above can be used in association with related services (e.g., image compression, extraction, blending, recognition, sorting and searching) for printing.

For enterprise storage, privacy can also be enforced. Based on enterprise security policy, auditing policy and storage capabilities, different types of data formats may be stored with multiple encryption schemes, and both user and enterprise administrator encryption keys can be considered.

For local storage, privacy can be provided for future usage. This can help a user track and analyze print data, and encryption for privacy can be enforced for downloading to a storage system at a later stage. When print data is extracted to a storage system, there can be a different policy applied to the data extraction with different secure levels.

Thus, the above described embodiments can provide for a more seamless storing of different types of data based on the cloud storage type with reduced user and enterprise administrator intervention. An end-to-end solution from printer driver to cloud storage system can be provided for a multiple cloud storage system. Furthermore, privacy can be enforced for data stored in the public cloud system. It is also possible for effective searching and retrieval with accountability and availability on the data that has been printed to be achieved.

Privacy can be enforced such that only the user that owns the decryption key can see confidential data. If an unrelated user obtains the document, the unprotected content can be viewed with standard XPS viewer application, but it is possible for the confidential data to not be seen.

Usability and availability can also be improved in view of the example embodiments described above. A more convenient method is seen to be provided for enterprise and user to audit the print data. Indexing, searching and filtering data with a public storage system with privacy can be facilitated for the user and the organization. Improved integration with existing enterprise system configurations and local user systems is made possible, with reduced user intervention. In addition, content comparison and processing can be done with various configurations.

Multiple encryption schemes can also be provided. For the enterprise and centralized environment, the document can be encrypted with a first user encryption key with a first user local policy, and again encrypted with an enterprise policy with an enterprise encryption key.

Regarding accountability, since it is possible to encrypt the confidential information and not the entire document, and to extract parts of data from the document, data size can be confined while maintaining necessary privacy. In addition, it is possible that the data can be reviewed by a standard XPS viewer (e.g., Window Office Web).

Regarding flexibility, the example embodiments described above can allow for a user to record portions of the document with selected portions of document encrypted, with desired formats based on the cloud document service provided. In other words, the user can record just a few keywords or information that is useful in the future.

Regarding compatibility, the example embodiments described above can support Google docs and Windows Web Office. The XPS document can correspond to zipped XML data. Google typically supports ZIP archive, and this can contain the images (if any) used in the document and an exported .html file. In addition, Google typically supports regular and hosted account types. With the above described embodiments, a user or organization can customize their Google environment to store printed data. In addition, a user can create PDF format data which Google supports as a native document format.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for generating and storing a markup language document within a network, the network including a client, and a plurality of storage locations, the method comprising:
generating a markup language document;
acquiring policy information for the markup language document, wherein the policy information includes a content-filtering policy, a security policy and a storage location policy for the markup language document;
determining a portion of the markup language document that is subject to security, based on the content-filtering policy included in the policy information;
determining a storage location for storage of the markup language document from among the plurality of storage locations, based on the storage location policy included in the policy information;
applying security to the determined portion of the markup language document based on the security policy included in the policy information; and
storing the markup language document including the portion of the markup language document to which security is applied on the determined storage location.

2. A method according to claim 1, wherein the network further includes a policy server, and the acquiring step accesses the policy server to acquire the policy information.

3. A method according to claim 1, wherein the plurality of storage locations correspond to plural storage servers.

4. A method according to claim 1, wherein the security policy corresponds to at least one of an encryption policy and a signing policy, and the applying security step respectively performs at least one of encryption and signing to the determined portion.

5. A method according to claim 1, wherein the policy information further includes authentication information for the markup language document, and the storing step stores the authentication information included in the policy information, together with the markup language document, on the identified storage location.

6. A method according to claim 1, wherein the markup language document is an XML Paper Specification document.

7. A method according to claim 1, wherein the network is an enterprise network, and the content-filtering and security policies apply enterprise-wide.

8. A method according to claim 1, wherein the markup language document corresponds to an image document service portal, so that data within the markup language document is processed and returned to the client for reassembly and reformulation of the markup language document.

9. A method according to claim 1, the method further comprising displaying a user interface for allowing a user to adjust the policy information.

10. A method according to claim 1, wherein the client comprises a driver.

11. A method according to claim 10, wherein the driver is a printer driver or a scan driver.

12. A method according to claim 10, wherein the driver performs the generating, acquiring, determining, identifying, applying and storing steps.

13. A method according to claim 10, wherein the network further includes a rendering server and a policy server from which the policy information is acquired, and the driver forwards the markup language document to the rendering server for performing the generating, acquiring, determining, identifying, applying and storing steps.

14. A method according to claim 13, wherein the policy server and the rendering server are implemented on a common machine within the network.

15. A method according to claim 13, wherein the policy server and the rendering server are implemented on different machines that communicate over the network.

16. A method according to claim 13, wherein the applying step comprises applying security to the determined portion of the markup language document with both user and administrator encryption keys, based on the security policy included in the policy information.

17. A method for generating and storing a Portable Document Format (PDF) document within a network, the network including a client, and a plurality of storage locations, the method comprising:
generating a PDF document;
acquiring policy information for the PDF document, wherein the policy information includes a content-filtering policy, a security policy and a storage location policy for the PDF document;
determining a portion of the PDF document that is subject to security, based on the content-filtering policy included in the policy information;
determining a storage location for storage of the PDF document from among the plurality of storage locations, based on the storage location policy included in the policy information;
applying security to the determined portion of the PDF document based on the security policy included in the policy information; and
storing the PDF document including the portion of the PDF document to which security is applied on the determined storage location.

18. A method according to claim 17, wherein the network further includes a policy server, and the acquiring step accesses the policy server to acquire the policy information.

19. A method according to claim 17, wherein the plurality of storage locations correspond to plural storage servers.

20. A method according to claim 17, wherein the security policy corresponds to at least one of an encryption policy and a signing policy, and the applying security step respectively performs at least one of encryption and signing to the determined portion.

21. A method according to claim 17, wherein the policy information further includes authentication information for the PDF document, and the storing step stores the authentication information included in the policy information, together with the PDF document, on the identified storage location.

22. A method according to claim 17, wherein the network is an enterprise network, and the content-filtering and security policies apply enterprise-wide.

23. A method according to claim 17, wherein the PDF document corresponds to an image document service portal, so that data within the PDF document is processed and returned to the client for reassembly and reformulation of the PDF document.

24. A method according to claim 17, the method further comprising displaying a user interface for allowing a user to adjust the policy information.

25. A method according to claim 17, wherein the client comprises a driver.

26. A method according to claim 25, wherein the driver is a printer driver or a scan driver.

27. A method according to claim 25, wherein the driver performs the generating, acquiring, determining, identifying, applying and storing steps.

28. A method according to claim 25, wherein the network further includes a rendering server and a policy server from which the policy information is acquired, and the driver forwards the PDF document to the rendering server for performing the generating, acquiring, determining, identifying, applying and storing steps.

29. A method according to claim 28, wherein the policy server and the rendering server are implemented on a common machine within the network.

30. A method according to claim 28, wherein the policy server and the rendering server are implemented on different machines that communicate over the network.

31. A method according to claim 28, wherein the applying step comprises applying security to the determined portion of the PDF document with both user and administrator encryption keys, based on the security policy included in the policy information.

32. An apparatus comprising:
a computer-readable memory constructed to store computer-executable process steps; and
a processor constructed to execute the computer-executable process steps stored in the memory;
wherein the process steps stored in the memory cause the processor to generate and store a markup language document within a network, the network including a client, and a plurality of storage locations, the process steps comprising:
generating a markup language document;
acquiring policy information for the markup language document, wherein the policy information includes a content-filtering policy, a security policy and a storage location policy for the markup language document;
determining a portion of the markup language document that is subject to security, based on the content-filtering policy included in the policy information;
identifying a storage location for storage of the markup language document from among the plurality of storage locations, based on the storage location policy included in the policy information;
applying security to the determined portion of the markup language document based on the security policy included in the policy information; and
storing the markup language document including the portion of the markup language document to which security is applied on the determined storage location.

33. An apparatus comprising:
a computer-readable memory constructed to store computer-executable process steps; and
a processor constructed to execute the computer-executable process steps stored in the memory;
wherein the process steps stored in the memory cause the processor to generate and store a Portable Document Format (PDF) document within a network, the network including a client, and a plurality of storage locations, the process steps comprising:
generating a PDF document;
acquiring policy information for the PDF document, wherein the policy information includes a content-filtering policy, a security policy and a storage location policy for the PDF document;
determining a portion of the PDF document that is subject to security, based on the content-filtering policy included in the policy information;
determining a storage location for storage of the PDF document from among the plurality of storage locations, based on the storage location policy included in the policy information;
applying security to the determined portion of the PDF document based on the security policy included in the policy information; and
storing the PDF document including the portion of the PDF document to which security is applied on the determined storage location.

34. A computer-readable memory medium on which is stored computer-executable process steps for causing a computer to perform generating and storing a markup language document within a network, the network including a client, and a plurality of storage locations, the process steps comprising:
generating a markup language document;
acquiring policy information for the markup language document, wherein the policy information includes a content-filtering policy, a security policy and a storage location policy for the markup language document;
determining a portion of the markup language document that is subject to security, based on the content-filtering policy included in the policy information;
determining a storage location for storage of the markup language document from among the plurality of storage locations, based on the storage location policy included in the policy information;
applying security to the determined portion of the markup language document based on the security policy included in the policy information; and
storing the markup language document including the portion of the markup language document to which security is applied on the determined storage location.

35. A computer-readable memory medium on which is stored computer-executable process steps for causing a computer to perform generating and storing a Portable Document Format (PDF) document within a network, the network including a client, and a plurality of storage locations, the process steps comprising:
generating a PDF document;
acquiring policy information for the PDF document, wherein the policy information includes a content-filtering policy, a security policy and a storage location policy for the PDF document;
determining a portion of the PDF document that is subject to security, based on the content-filtering policy included in the policy information;
determining a storage location for storage of the PDF document from among the plurality of storage locations, based on the storage location policy included in the policy information;
applying security to the determined portion of the PDF document based on the security policy included in the policy information; and
storing the PDF document including the portion of the PDF document to which security is applied on the determined storage location.

* * * * *